United States Patent
Morin

[11] 3,757,288
[45] Sept. 4, 1973

[54] CAVITATION DETECTOR
[75] Inventor: Jean-Yves Jules Henri Morin, Toulon, France
[73] Assignee: Etat Francais, Paris, France
[22] Filed: July 16, 1971
[21] Appl. No.: 163,299

[30] Foreign Application Priority Data
July 17, 1970 France .............................. 7026355

[52] U.S. Cl. ................................ 340/5 R, 328/165
[51] Int. Cl. .......................................... H04b 11/00
[58] Field of Search ...................... 340/2, 5 R, 6 R; 328/165

[56] References Cited
UNITED STATES PATENTS
3,617,998  11/1971  Freedman .......................... 340/5 R
3,147,467  9/1964  Laakmann ........................ 340/261

Primary Examiner—Richard A. Farley
Attorney—Eric H. Waters, John G. Schwartz et al.

[57] ABSTRACT

To distinguish between cavitation and ambient noise, signals are passed to parallel integrator circuits having different time constants which circuits respectively integrate the ambient noise portion alone or in combination with the cavitation portion, the resulting signals being subtracted to obtain an indication of the presence of cavitation.

5 Claims, 1 Drawing Figure

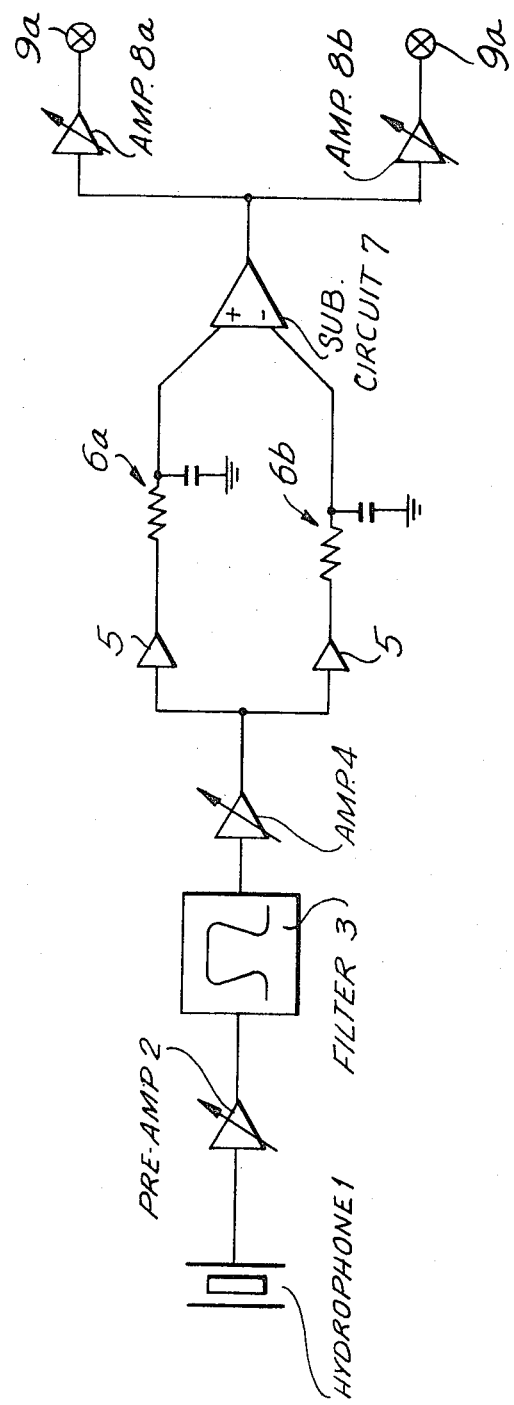

3,757,288

CAVITATION DETECTOR

FIELD OF INVENTION

This invention relates to cavitation detectors and more particularly to detectors capable of distinguishing between ambient noise and cavitation.

BACKGROUND

It is known that liquid media may be subjected to the phenomenon of cavitation as a result of the occurrence within the liquid of localized and temporary pressure variations due, for example, to the presence of a mechanical oscillator or a rotating body. This is the case, for example, with the cavitation of the propellers of ships, the blades of hydro-electric turbines and electro-acoustic transducers.

This phenomenon is generally detrimental since it causes considerable damage to materials and losses in performance of the apparatus in the vicinity of which this phenomenon appears. Therefore, it is important to be able to detect it and possibly, to appreciate its magnitude.

It is known that cavitation consists of the formation of bubbles of gas in a liquid which implode almost immediately after they form. As a result there is an increase in the level of noise occurring in the liquid, the term "noise" designating in this case a chance fluctuation of pressure.

The methods and apparatus for detecting cavitation which are known are all based on measuring the variation of the mean level of ambient noise. This is characterized by many disadvantages. More particularly, the measurement of this level is not indicative of the magnitude of the cavitation, since it depends on the mean level of other noises. Moreover, it may result in confusion as to the origin of the increased mean noise level. Thus these known devices cannot distinguish noise due to the cavitation of a body which is moving relatively to a liquid where the hydrostatic pressure is relatively low from that, in the absence of cavitation, of a body which is in rapid relative movement in a liquid where the hydrostatic pressure is considerable.

An object of the present invention is to obviate the above disadvantages and render the detection and evaluation of the phenomenon of cavitation independent of noise or chance fluctuations in pressure occurring in a liquid medium in the absence of cavitation.

For this purpose, an electric voltage delivered by a pressure pickup (also called a transducer) is distributed over two channels where it is subjected to detection and integration, the integration time constant of one of the channels being determined so as to be responsive only to noise in the absence of cavitation, whereas that of the other is determined so as to be responsive to the existing total noise, that is to say in particular to cavitation. The noise due to cavitation, as is known, manifests itself in short pressure variations of considerable amplitude, with a steep front. The frequency of repetition and the amplitude of these variations make it possible to characterize the amount of the cavitation. They increase at the same time as the cause of the phenomenon (for example, increase in the rotational speed of the propellers of a ship). The noise, in the absence of cavitation, is generally present in different form. The sudden variations in pressure are less frequent and the frequency spectrum is more regular. Furthermore, the amplitudes of the sudden variations in pressure due to cavitation are generally greater by 10 to 20 decibels than those of the mean level of permanent noise in the absence of cavitation.

BRIEF DESCRIPTION OF THE DRAWING

The invention will be better understood from the following description of one particular non-limitative application in the form of a preferred but non-exclusive embodiment considered in conjunction with the accompanying drawing in which the sole FIGURE is a schematic diagram of a circuit of the invention.

DETAILED DESCRIPTION

The illustrated circuit is a detector for the cavitation caused by the rotation of the propellers of a ship, for example a submarine. As shown in FIG. 1 a hydrophone 1 is situated in the vicinity of the cavitation source. It transforms the pressure fluctuations of the water into fluctuations of electric voltage. It has a sensitivity, for example, of −96 decibels (ref. 1 volt per bar).

It is followed:

— by a pre-amplifier 2 having a high input impedance (greater than 600 kiloohms) with an adjustable gain whose maximum value is 50 decibels (ref. 1 volt)

— by a filter 3 whose band-pass (for 3 decibels of attenuation) range is between 1 and 20 kilohertz — by an amplifier 4 of 40 decibels gain which acts on two parallel channels each comprising a square-law detector 5

— by integrators 6a and 6b, each detector being followed by integrator 6a or 6b one of which has a time constant of one hundredth of a second and the other a time constant of a thousandth of a second — by subtraction circuit 7, the output voltages of the two integrators being subtracted from one another in the circuit 7 and their difference being introduced at the inputs of two amplifiers 8a and 8b which act on triggers having different voltage thresholds, causing the lighting-up of two pilot lights 9a and 9b one of which indicates slight cavitation and the other considerable cavitation.

In the absence of cavitation, the difference in electric voltage between the two detection-integration channels is constant whatever the level of noise at the input (noise of the sea and of the ship in the present case) over a wide variation in this level (up to 20 decibels variation).

If there is cavitation, the short pulses of the corresponding noise are detected by the channel which has the shortest integration time constant. The voltage obtained at the output of the integrator is all the greater in proportion as the amplitude of these pulses is substantial and their repetition frequency high.

What is claimed is:

1. Apparatus for detecting, in a liquid medium, cavitation in the presence of ambient noise which tends to obscure the same, said apparatus comprising means to transduce ambient noise and cavitation produced incidental to rotation of the propeller of a ship into an electrical signal, first and second parallel integrator means to receive said signal and having different time constants such that the integrator means are adapted respectively for integrating the ambient noise alone and the ambient noise with the cavitation to provide two output voltages, means to compare said voltages to determine the presence of cavitation, and a filter between the first said means and integrator means and having a band-pass range of from 1 to 20 kilohertz, the said time constants being about one hundreth and one thousandth of a second respectively.

2. Apparatus as claimed in claim 1 wherein said means to compare said voltages includes a subtraction circuit.

3. Apparatus as claimed in claim 1 comprising indicator means coupled to said means to compare said voltages.

4. Apparatus as claimed in claim 3 wherein the indicator means include triggers.

5. Apparatus as claimed in claim 1 wherein said means to compare said voltages with a reference voltage.

* * * * *